United States Patent
Tanaka et al.

(10) Patent No.: US 6,555,192 B1
(45) Date of Patent: *Apr. 29, 2003

(54) PRESSURE-SENSITIVE CLEANING SHEET, IMAGE-FORMING MATERIAL HAVING CLEANING PART, AND METHOD OF CLEANING IMAGE-FORMING APPARATUS

(75) Inventors: Naomitu Tanaka, Osaka (JP); Tatsuo Koyama, Osaka (JP); Masanori Sano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/904,868

(22) Filed: Aug. 1, 1997

(30) Foreign Application Priority Data

Aug. 2, 1996 (JP) ............................................. 8-204593
Apr. 16, 1997 (JP) ............................................. 9-099034

(51) Int. Cl.$^7$ ................................................ B32B 9/00
(52) U.S. Cl. .............................. 428/40.1; 15/104.002; 399/327; 399/347; 399/352; 428/41.7; 428/41.8; 428/53; 428/54; 428/55; 428/111; 428/167
(58) Field of Search ..................... 15/104.002; 399/352, 399/347, 327; 428/53, 54, 55, 40.1, 41.7, 41.8, 111, 167

(56) References Cited

U.S. PATENT DOCUMENTS

| | | | |
|---|---|---|---|
| 3,889,310 A | * 6/1975 | Barouh | 15/210 R |
| 5,153,964 A | * 10/1992 | Gelardi | 15/229.12 |
| 5,227,844 A | 7/1993 | Bhattacharjee et al. | 355/215 |
| 5,736,470 A | * 4/1998 | Schneberger | 428/317.1 |

FOREIGN PATENT DOCUMENTS

EP 0379 959 A 8/1990

OTHER PUBLICATIONS

Patent Abstracts of Japan, vol. 15, No. 322 (P–1239), Aug. 16, 1991 of JP 03 118583 A (Hiroyuki Kanai), May 21, 1991.
Patent Abstracts of Japan, vol. 12, No. 116 (M–684) '2963, Apr. 13, 1988 of JP 62 244677 A(NEC Corp.), Oct. 26, 1987.
Patent Abstracts of Japan, vol. 13, No. 577 (M–910) '3925, Dec. 20, 1989 of JP 01 242278 A (Canon Inc.), Sep. 27, 1989.
Patent Abstracts of Japan, vol. 16, No. 477 (M–1320), Oct. 5, 1992 of JP 04 173289 A (Ricoh Co., Ltd.), Jun. 19, 1992.
Patent Abstracts of Japan, vol. 97, No. 6, Jun. 30, 1997 of JP 09 029191 A (Nitto Denko Corp.), Feb. 4, 1997.

* cited by examiner

Primary Examiner—Nasser Ahmad
(74) Attorney, Agent, or Firm—Sughrue Mion, PLLC

(57) ABSTRACT

A pressure-sensitive cleaning sheet is disclosed which comprises a substrate, a pressure-sensitive adhesive layer formed on one or both sides of the substrate, and a porous screen disposed on the pressure-sensitive adhesive layer. The cleaning sheet is substantially non-tacky when the cleaning sheet surface is kept in a non-pressed state, and exhibits tackiness when the cleaning sheet surface is kept in a pressed state. Also disclosed are a method of using the cleaning sheet, an image-forming material having a cleaning part, and a method of cleaning an image-forming apparatus. These are useful for the cleaning of, e.g., the magnetic reading parts and magnetic-card transport parts of apparatuses accepting various magnetic cards and the thermal heads and/or transport rollers of various recording apparatuses.

10 Claims, 4 Drawing Sheets

PRESSURE-SENSITIVE CLEANING SHEET, IMAGE-FORMING MATERIAL HAVING CLEANING PART, AND METHOD OF CLEANING IMAGE-FORMING APPARATUS

FIELD OF THE INVENTION

The present invention relates to a pressure-sensitive cleaning sheet, a method of using the same, an image-forming material having a cleaning part, and a method of cleaning an image-forming apparatus. These are useful for, e.g., the cleaning of the magnetic reading parts and magnetic-card transport parts of apparatuses accepting various magnetic cards, such as reader/writers for rewritable cards and magnetic-card public telephones, the cleaning of the thermal printing head parts of thermal transfer printers, and the cleaning of the thermal heads and/or transport rollers of various recorders such as thermal recorders, printers for newspapers and journals, OA apparatus printers, and photographic printers.

BACKGROUND OF THE INVENTION

In magnetic-card readers, for example, the magnetic reading part and the magnetic-card transport part (belts and rollers) are gradually fouled due to foreign matters adherent to magnetic cards, such as sebaceous or oily secretions from fingers and dust particles. The fouling may finally results in a reading failure. In order to avoid this, the magnetic reading part and the magnetic-card transport part need to be cleaned periodically.

In thermal transfer printers, there are cases where the thermal head part is fouled by the ink ribbon to cause blurring, etc. The thermal head part hence needs to be cleaned periodically.

Image-forming apparatuses such as the printers of word processors and facsimile telegraphs and bar code printers employ image-forming materials such as ink ribbons and toners. For example, in the image-forming apparatuses employing an ink ribbon, in which the thermal head should be brought into contact with the ink ribbon, there is a problem that foreign matters adhere to the heating part of the thermal head and accumulate thereon as the number of contacts increases, resulting in troubles in image formation.

The image-forming apparatuses employing heat-sensitive recording media have the same troubles.

The transport rollers of the above image-forming apparatuses also are fouled by the adhesion of dust particles present in the surrounding atmosphere and of paper dust, etc., resulting in transport troubles. In printers for newspapers or journals, photographic printers, and the like, which frequently employ paper as an image-receiving material, there is a problem that paper dust adheres to the rolls and accumulates thereon as the number of times of use increases, resulting in transport troubles.

At present, there is no sufficient measure to overcome the above problems. In case of troubles, it has been necessary to stop the apparatus to disassemble and clean the same. However, the cleaning requires much time, during which the apparatus cannot be used, causing great inconvenience.

Prior art cleaning techniques proposed so far include: a method in which a cleaning sheet of any of various card sizes which comprises a substrate sheet having a mere pressure-sensitive adhesive layer on one or both sides thereof is inserted into an apparatus accepting magnetic cards, whereby dust particles and other foreign matters adherent to the magnetic reading part and the magnetic-card transport part are transferred to the pressure-sensitive adhesive surface; and a method in which a cleaning sheet comprising a substrate sheet and a liquid-absorbing layer, e.g., a cloth or a nonwoven fabric, disposed on one or both sides of the substrate through a pressure-sensitive adhesive layer is inserted into an apparatus accepting magnetic cards after the liquid-absorbing layer is impregnated with a solvent such as acetone or an alcohol or with water, whereby dust particles and other foreign matters adherent to the magnetic reading part and the card transport part are wiped away with the solvent-impregnated layer of the cleaning card (see, for example, JP-A-U-5-90608). (The term "JP-A-U" as used herein means an "unexamined published Japanese utility model application".)

However, cleaning with the above-described cleaning card impregnated with a solvent is disadvantageous in that the working atmosphere becomes worse due to solvent vapor and the use of a solvent may damage the magnetic reading part or transport part or may cause other troubles.

In contrast, cleaning with the above-described pressure-sensitive cleaning sheet eliminates those troubles. However, if a strongly tacky pressure-sensitive adhesive is used for heightening the cleaning efficiency, there are problems, for example, that transfer of the pressure-sensitive adhesive to the surfaces to be cleaned (so-called adhesive transfer) and winding of the cleaning sheet around a transport roller are apt to occur, and that smooth cleaning is difficult since the cleaning sheet is apt to be caught due to its tackiness at the magnetic-card insertion opening or takeout opening in an apparatus accepting magnetic cards. On the other hand, if a weakly tacky pressure-sensitive adhesive is used, the efficiency of the removal of foreign matters including dust particles decreases inevitably, so that the pressure-sensitive cleaning sheet should be repeatedly inserted a larger number of times, unavoidably resulting in a decrease in the efficiency of cleaning.

In the case of conducting cleaning with any of these prior art cleaning sheets, the cleaning sheet is actually used only when the apparatus has come not to work. Thus, the prior art techniques do not provide a drastic measure.

Still another cleaning technique has been proposed, e.g., in JP-A-U-64-30259 and JP-A-63-8136 (the term "JP-A" as used herein means an "unexamined published Japanese patent application"), in which a body to be transported, such as ink sheets, having a pressure-sensitive adhesive layer for cleaning as a part thereof is used. However, this prior art cleaning technique also has the same problems as the above, and is still unsatisfactory.

SUMMARY OF THE INVENTION

A first object of the present invention is to provide a pressure-sensitive cleaning sheet with which cleaning can be easily and smoothly conducted highly efficiently while satisfactorily preventing adhesive transfer. Specifically, the object is to provide a pressure-sensitive cleaning sheet with which fouling substances can be easily removed, for example, from the magnetic reading part or magnetic-card transport part of an apparatus accepting magnetic cards and from the thermal head part of the printing part of a thermal transfer printer.

A second object of the present invention is to provide a roll-form image-forming material which has a specific cleaning part and with which not only fouling substances can be removed from an image-forming apparatus without stopping the same, but the number of times of disassembling/cleaning can be reduced.

The present invention provides a pressure-sensitive cleaning sheet comprising a substrate, a pressure-sensitive adhesive layer formed on one or both sides of the substrate, and a porous screen disposed on the pressure-sensitive adhesive layer, the cleaning sheet being substantially non-tacky when the cleaning sheet surface is kept in a non-pressed state, under which the porous screen is projecting from the surface of the pressure-sensitive adhesive layer, and the cleaning sheet exhibiting tackiness when the cleaning sheet surface is kept in a pressed state, under which the pressure-sensitive adhesive layer appears on the sheet surface through the openings of the porous screen to thereby have a surface which is on almost the same level as the surface of the porous screen.

DETAILED DESCRIPTION OF THE INVENTION

Embodiments of the present invention will be explained below by reference to the drawings. However, the present invention should not be construed as being limited to these embodiments.

FIG. 1(A) is a plan view illustrating an embodiment of the pressure-sensitive cleaning sheet according to the present invention. FIG. 1(B) is a sectional view taken on the line 1—1 of FIG. 1(A).

In FIG. 1(A) and (B), numeral 1 denotes a sheet-form substrate. The substrate has such a flexural modulus that it can almost completely recover its original flat shape after being bent during use as described later. Examples of the sheet-form substrate 1 include sheets of plastics such as poly(ethylene terephthalate), polypropylene, and polyvinyl chloride, papers (in particular, resin-impregnated papers), synthetic papers, and laminates of these. The thickness of the sheet is not particularly limited, and may be suitably decided according to, e.g., the thicknesses of the insertion openings of apparatuses. The substrate usually has a thickness of about from 12 μm to 2.0 mm. The preferred range of the thickness thereof is about from 50 μm to 1.0 mm from the standpoints of the sizes of the insertion openings of apparatuses, hardness suitable for handling, etc.

Numeral 2 denotes a pressure-sensitive adhesive layer formed on at least one side of the sheet-form substrate 1. The material of the pressure-sensitive adhesive layer 2 is not particularly limited, and examples thereof include synthetic rubbers, such as acrylic, styrene, and silicone rubbers, and natural rubber. The thickness of the pressure-sensitive adhesive layer 2 is preferably smaller than that of the porous screen described below, especially desirably by about 10 to 50%. If the pressure-sensitive adhesive layer has too large a thickness, there is a fear that the pressure-sensitive adhesive may protrude on the porous screen.

Numeral 3 denotes a porous screen disposed on the surface of the pressure-sensitive adhesive layer 2. Examples of the porous screen include woven fabrics, nonwoven fabrics, papers, plastic nets, and knit fabrics. Especially preferably used are knit fabrics such as those shown in FIG. 2(A) and (B) (having an average yarn thickness of, e.g., from 10 to 300 μm), from the standpoint that such fabrics are effective in enhancing elasticity in the thickness direction due to the yarn intersections thereof.

The material of the porous screen is not particularly limited. Examples thereof include polyesters, polypropylenes, Tetoron, and mixtures of these.

In FIG. 1(A) and (B), numeral 20 denotes the exposed pressure-sensitive adhesive layer surface which appears on the sheet surface through the openings of the porous screen 3. The ratio of the area $S_1$ of the exposed pressure-sensitive adhesive layer surface 20 to the area $S_2$ of the non-exposed pressure-sensitive adhesive layer surface which the porous screen 3 covers, $S_1/S_2$, is generally from 50/1 to 1/10, preferably from 20/1 to 1/5, more preferably from 10/1 to 1/3. If the ratio $S_1/S_2$ exceeds 50, it is not ensured that the cleaning sheet is substantially non-tacky when the sheet is in a non-pressed state, which will be described below. On the other hand, if that ratio is below 1/10, the cleaning sheet hardly exhibits tackiness when the sheet is in a pressed state, which will be described below.

Figure 3:
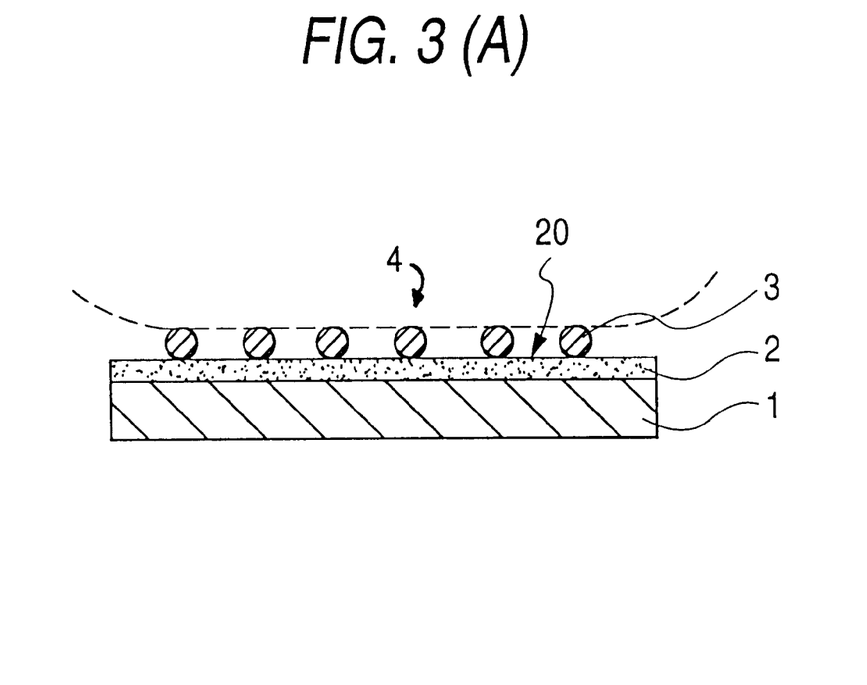
FIGS. 3(A) and 3(B) are sectional views illustrating the states of a pressure-sensitive cleaning sheet according to the present invention which is being used in respective stages.

Even when the pressure-sensitive cleaning sheet of the present invention is brought into contact with a member to be cleaned 4, in such a manner that the porous screen 3 comes into contact with the member 4 at a contact pressure of substantially zero as shown in FIG. 3(A), the member to be cleaned 4 is prevented from coming into contact with the exposed pressure-sensitive adhesive layer surface 20. This is because the porous screen 3 is projecting from the surface of the pressure-sensitive adhesive layer 2. As a result, the pressure-sensitive cleaning sheet 2 is substantially non-tacky. The term "substantially non-tacky" used herein means that the cleaning sheet feels non-tacky by the light touch.

In contrast, when the member to be cleaned 4 is brought into contact with the porous screen 3 at a sufficient contact pressure, the surface of the cleaning sheet is kept in a pressed state and the cleaning sheet is deformed, as shown in FIG. 3(B). As a result, the pressure-sensitive adhesive layer 2 appears on the sheet surface through the openings of the porous screen 3, whereby the exposed pressure-sensitive adhesive layer surface 20 is on almost the same level as the surface of the porous screen 3. Since the exposed pressure-sensitive adhesive layer surface 20 thus comes into contact with the member to be cleaned 4, the cleaning sheet exhibits tackiness.

The cleaning sheet desirably has a moderate adhesive strength. This is because if a cleaning sheet having too high an adhesive strength is used for the cleaning of an apparatus, the sheet may damage the surface of the transport rubber rollers or other parts of the apparatus or may cause adhesive transfer. The adhesive strength (at 23° C.) of the cleaning sheet is usually 5 kg/20 mm or lower, preferably about from 2 kg/20 mm to 200 g/20 mm. The adhesive strength of a cleaning sheet is herein determined through a test in which the cleaning sheet on which a porous screen has not been disposed is applied to a stainless-steel plate by pressing the sheet against the plate by rolling a 2-kg roller forward and backward once on the sheet, and the resultant test piece is immediately subjected to 180° peeling at a peel rate of 300 mm/min.

After the member to be cleaned 4 is contacted with the exposed pressure-sensitive adhesive layer surface 20 with pressing as shown in FIG. 3(B), the member 4 is separated from the exposed pressure-sensitive adhesive layer surface 20. Upon the separation, dust particles and other foreign matters adherent to the surface of the member to be cleaned 4 are transferred to the exposed pressure-sensitive adhesive layer surface 20, whereby the surface of the member to be cleaned 4 is cleaned. In this case, a tensile force is applied to the interface between the exposed pressure-sensitive adhesive layer surface 20 and the member to be cleaned 4 during the peeling of the surface 20 from the member 4. During the peeling, the exposed pressure-sensitive adhesive layer surface 20 is held in place by the mesh structure of the porous screen 3, whereby the tensile stress f exerted on the interface between the exposed pressure-sensitive adhesive layer surface 20 and the substrate 1 is reduced accordingly. As a result, the exposed pressure-sensitive adhesive layer surface 20 can be satisfactorily prevented from being separated from the substrate 1 and being transferred to the member to be cleaned 4 (i.e., prevented from causing adhesive transfer).

After the exposed pressure-sensitive adhesive layer surface 20 is brought into contact with the member to be cleaned 4 with pressing, the member 4 is separated from the exposed pressure-sensitive adhesive layer surface 20, upon which separation the cleaning sheet is released from pressing. Since the substrate, pressure-sensitive adhesive layer, and porous screen 3 which are components of the cleaning sheet of the present invention each has moderate elasticity, the cleaning sheet recovers from deformation upon release from pressing. As a result, the porous screen sheet 3 projects from the surface of the exposed pressure-sensitive adhesive layer 20 as shown in FIG. 3(A), and the cleaning sheet hence comes again to be substantially non-tacky.

Especially in the case where transport rollers or belts in a card transport part are to be cleaned, the upper and lower transport members are in contact with each other while being pressed against each other since these members are generally made of a rubbery elastomer. Because the cleaning sheet passes between the upper and lower transport members which are being pressed against each other, the sheet is deformed by the pressing and the rubber elastomer members for transport are also deformed simultaneously. As a result, the exposed pressure-sensitive adhesive layer surface comes into contact with the members to be cleaned. After passing through the transport part, the sheet recovers its original shape mainly due to the rigidity of the substrate.

In the case where a magnetic reading part or a thermal head part is to be cleaned, the cleaning sheet inserted thereinto is pressed by means of a press roller against the part to be cleaned, and thus comes into a pressed state. Since the press roller also is made of a rubbery elastomer, the cleaning card is deformed and the exposed pressure-sensitive adhesive layer surface comes into contact with the part to be cleaned, as in the above case.

The present invention produces the following effect besides the above. The part to be cleaned 4 is wiped with the surface of the porous screen 3. As a result, fouling substances are wiped off and caught by the pressure-sensitive adhesive layer 2. This effect is pronounced especially when the cleaning sheet is thick (like the cash card type) and less apt to be deformed.

The total thickness of the pressure-sensitive cleaning sheet according to the present invention may be suitably decided according to the size of the insertion opening of the apparatus to be cleaned. For example, in the case where the cleaning sheet is to be used for cleaning the magnetic reading part and magnetic-card transport part of a reader/writer for rewritable cards, the total thickness of the cleaning sheet is usually about from 200 to 320 $\mu$m.

The cleaning of, for example, the magnetic reading part and magnetic-card transport part of a reader/writer for rewritable cards or a thermal head part for thermal printing with the pressure-sensitive cleaning sheet according to the present invention is conducted as follows. First, the card type pressure-sensitive cleaning sheet (hereinafter referred to as cleaning card) is inserted into the card insertion opening. In this stage, the cleaning card is in a non-pressed state and hence is substantially non-tacky. Thus, the insertion is accomplished exceedingly smoothly.

The cleaning card inserted is drawn into the apparatus by means of draw rolls, and passes through the magnetic-card transport part. During the passing, the surface of the porous screen, which is in contact with the transport part, is pressed and the card surface exhibits tackiness as described above. Thus, with the passing of the cleaning card, the magnetic-card transport part is cleaned. The cleaning card subsequently comes into contact with the surface of the magnetic reading part. As a result, the reading part surface is wiped with the porous screen to separate fouling substances from the surface. The fouling substances come into contact with the exposed pressure-sensitive adhesive layer surface and are thus removed.

Thereafter, the cleaning card is sent to the card takeout opening by means of the rotational force of the draw rolls. The cleaning card is thus separated from the magnetic-card transport part and magnetic reading part or from the thermal head part without causing adhesive transfer.

When the cleaning card has passed through the draw rolls, it is in a substantially non-pressed state and the card surface hence comes again to be substantially non-tacky. As a result, the cleaning card smoothly appears at the card takeout opening.

When used for the cleaning of an apparatus in which the passageway extending from the card insertion opening to the card takeout opening has a bent part, the cleaning card recovers its flat shape immediately after passing through the bent part because the cleaning card is highly elastic as long as the sheet-form substrate thereof has a thickness of about from 50 to 350 $\mu$m. Therefore, the cleaning card can pass smoothly through the bent part and the subsequent passageway part.

The pressure-sensitive cleaning sheet of the present invention can have a constitution comprising a sheet-form substrate, a pressure-sensitive adhesive layer formed on each side of the substrate, and a porous screen disposed on each pressure-sensitive adhesive layer. Cleaning with this cleaning sheet can be conducted, for example, in such a manner that one side of the sheet is used in the first insertion and the other side thereof is used in the second insertion.

Besides being used for the cleaning of the magnetic reading part and magnetic-card transport part of a reader/writer for rewritable cards, as described above, the pressure-sensitive cleaning sheet according to the present invention is usable for the cleaning of the magnetic reading parts, magnetic-card transport parts, and other parts of apparatuses accepting various magnetic cards, such as, e.g., public telephones, automatic checking and collecting machines, and ticket dispensers accepting cards such as Orange Cards (which are used in Japan), IC card readers, cash dispensers, and prepaid card machines. The cleaning sheet of the present invention is also usable for the cleaning of the printing parts and transport parts, e.g., draw rolls, of various printers and copiers of the thermal transfer and other types. In such applications, the pressure under which the cleaning sheet exhibits tackiness is generally 30 g/cm² or more.

The present invention furthermore provides a roll-form image-forming material having a cleaning part, which comprises a pressure-sensitive adhesive layer having a porous screen disposed thereon.

The cleaning part is substantially non-tacky when the cleaning part surface is kept in a non-pressed state, under which the porous screen is projecting from the surface of the pressure-sensitive adhesive layer. The cleaning part exhibits tackiness when the cleaning part surface is kept in a pressed state, under which the pressure-sensitive adhesive layer appears on the cleaning part surface through the openings of the porous screen to thereby have a surface which is on almost the same level as the surface of the porous screen.

Figure 4:
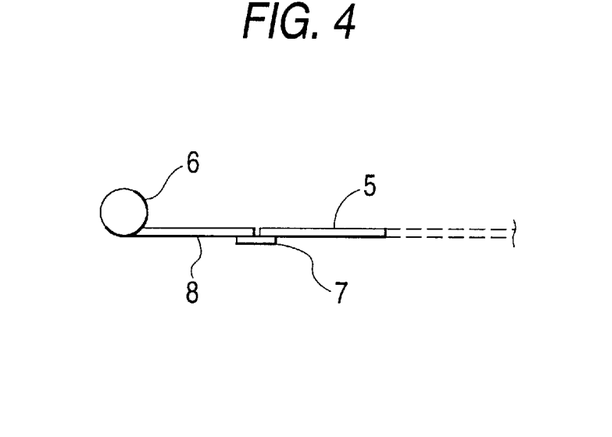
FIG. 4 is a diagrammatic view of a roll-form image forming material according to the present invention.
Figure 5:
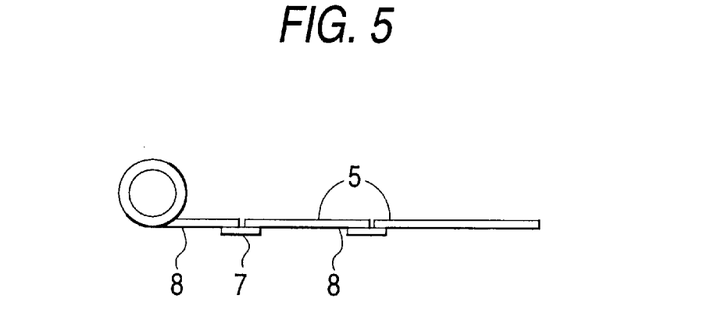
FIG. 5 is a diagrammatic view of another roll-form image forming material according to the present invention.
Figure 6:
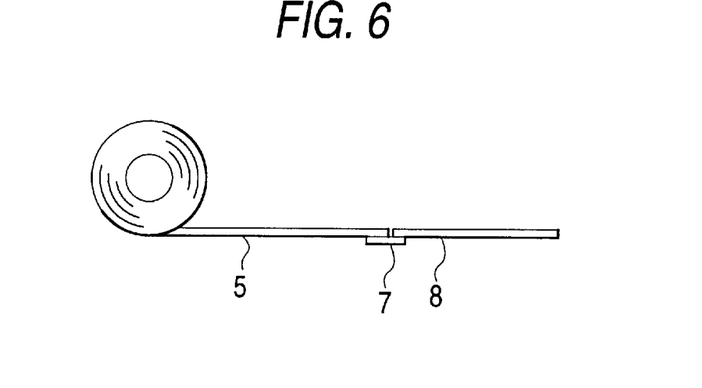
FIG. 6 is a diagrammatic view of still another roll-form image forming material according to the present invention.

Examples of the image-forming material of the present invention include heat-sensitive recording papers, ink ribbons, photographic printing papers, and other general printing materials which each has the above-described specific cleaning part as a part thereof. These image-forming materials are not particularly limited in the position where the cleaning part has been disposed and in methods for forming the cleaning part. For example, as shown in FIGS. 4 to 6, a cleaning part 8 can be connected with a connecting tape 7 or the like to an image-forming material 5, such as a roll-form ink ribbon or printing material, at the front end of the material 5 wound around a core 6 (FIG. 4), or somewhere between the front and rear ends thereof (FIG. 5), or at the rear end thereof (FIG. 6). In this case, the connection is preferably conducted in such a manner that the image-forming material 5 does not overlap the cleaning part 8, from the standpoint of cleaning efficiency, etc.

The pressure-sensitive cleaning sheet according to the present invention is substantially non-tacky in a non-pressed state, and exhibits tackiness upon pressing. Upon release from the pressing, the cleaning sheet recovers the substantially non-tacky properties or weak tackiness. Therefore, the cleaning sheet can be smoothly inserted into an apparatus accepting magnetic cards. During the passing thereof through the magnetic reading part and magnetic-card transport part, the cleaning sheet is in a pressed state and is capable of efficiently cleaning these parts by means of the sufficiently high adhesive strength thereof. When the cleaning sheet has passed through the transport part, it is released from pressing and thus recovers the substantially non-tacky properties. Hence, the cleaning sheet can be smoothly taken out. The cleaning sheet is extremely useful for the cleaning of, e.g., magnetic reading parts, magnetic-card transport parts, and the printing parts of various printers.

Furthermore, the roll-form image forming material of the present invention has the following effects. By transporting the image-forming material through any of various image-forming apparatuses, the thermal head and transport rollers can be cleaned automatically during use without stopping the apparatus. Hence, the number of times of disassembling/cleaning can be considerably reduced.

The present invention will be explained below in more detail by reference to Examples, but the invention should not be construed as being limited thereto in any way.

EXAMPLE 1

On one side of a poly(ethylene terephthalate) sheet having a thickness of 188 μm was formed a layer of an acrylic pressure-sensitive adhesive (obtained by copolymerizing a mixture consisting of 90 parts by weight of 2-ethylhexyl acrylate, 10 parts by weight of acrylic acid, and 300 parts by weight of ethyl acetate) having a thickness of 30 μm (on a dry basis). The knit fabric shown in FIG. 2(A) (made of a polyester; average yarn thickness, 45 μm) was adhered as a porous screen to the pressure-sensitive adhesive layer by pressing with an iron roll at 130° C. The resultant structure was cut into a card size to obtain a card type pressure-sensitive cleaning sheet.

In this cleaning sheet, the ratio of the area $S_1$ of the exposed surface of the pressure-sensitive adhesive layer which had appeared on the sheet surface through the openings of the porous screen to the area $S_2$ of the surface of the non-exposed pressure-sensitive adhesive layer which the porous screen covers, $S_1/S_2$, was 3.8/1.

The adhesive strength of this cleaning sheet as determined by the method described hereinabove was 850 g/20 mm.

EXAMPLE 2

Figure 2A:
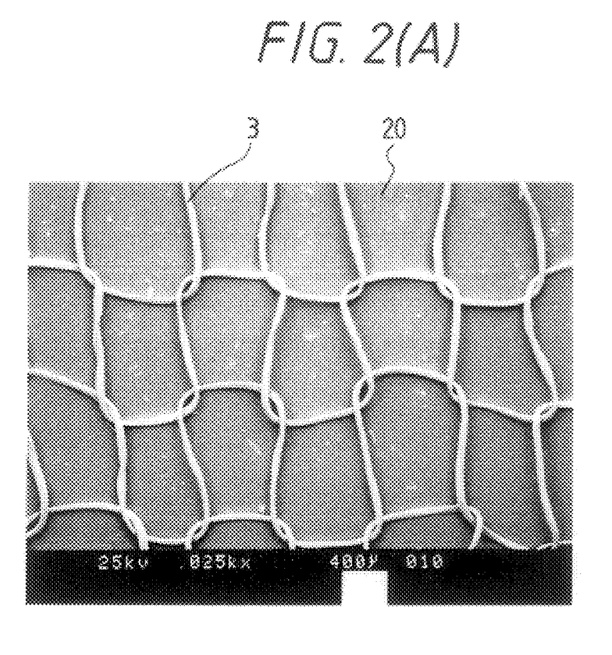
FIGS. 2(A) and 2(B) are microphotographs (scanning electron microscope photographs) showing yarn patterns on the surfaces of other embodiments of the pressure-sensitive cleaning sheet according to the present invention.
Figure 2B:
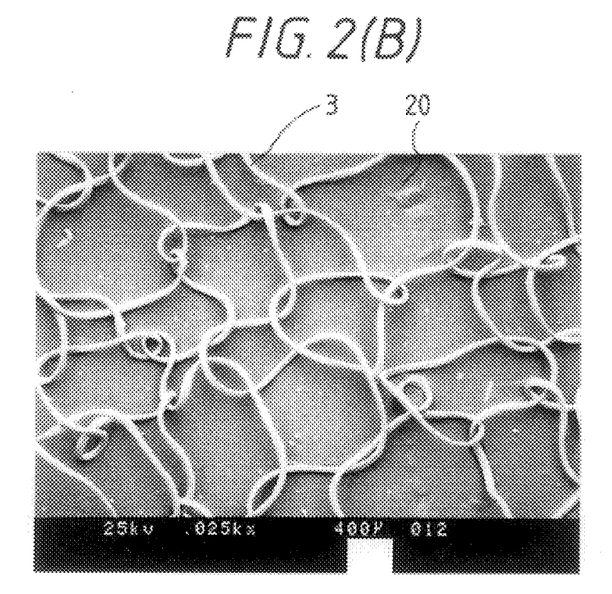

A card type pressure-sensitive cleaning sheet was obtained in the same manner as in Example 1, except that the porous screen was replaced with the knit fabric shown in FIG. 2(B) (made of a polyester; average yarn thickness, 45 μm).

In this cleaning sheet, the ratio of the area $S_1$ of the exposed surface of the pressure-sensitive adhesive layer which had appeared on the sheet surface through the openings of the porous screen to the area $S_2$ of the surface of the non-exposed pressure-sensitive adhesive layer which the porous screen covers, $S_1/S_2$, was 3.4/1.

The adhesive strength of this cleaning sheet as determined by the method described hereinabove was 850 g/20 mm.

EXAMPLE 3

A card type pressure-sensitive cleaning sheet was obtained in the same manner as in Example 1, except that the pressure-sensitive adhesive was replaced with a synthetic rubber pressure-sensitive adhesive (obtained by compounding 100 parts by weight on a solid basis of a 50 wt % toluene solution of a styrene-isoprene-styrene polymer (Kraton 1107, manufactured by Shell Kagaku K.K., Japan) with 150 parts by weight of a tackifier (Marukarez H700M, manufactured by Maruzen Petrochemical Co., Ltd., Japan) and 3 parts by weight of an antioxidant).

In this cleaning sheet, the ratio of the area $S_1$ of that exposed surface of the pressure-sensitive adhesive layer which had appeared on the sheet surface through the openings of the porous screen to the area $S_2$ of the surface of the non-exposed pressure-sensitive adhesive layer which the porous screen covers, $S_1/S_2$, was 3.8/1.

The adhesive strength of this cleaning sheet as determined by the method described hereinabove was 1,800 g/20 mm.

EXAMPLE 4

Figure 1:
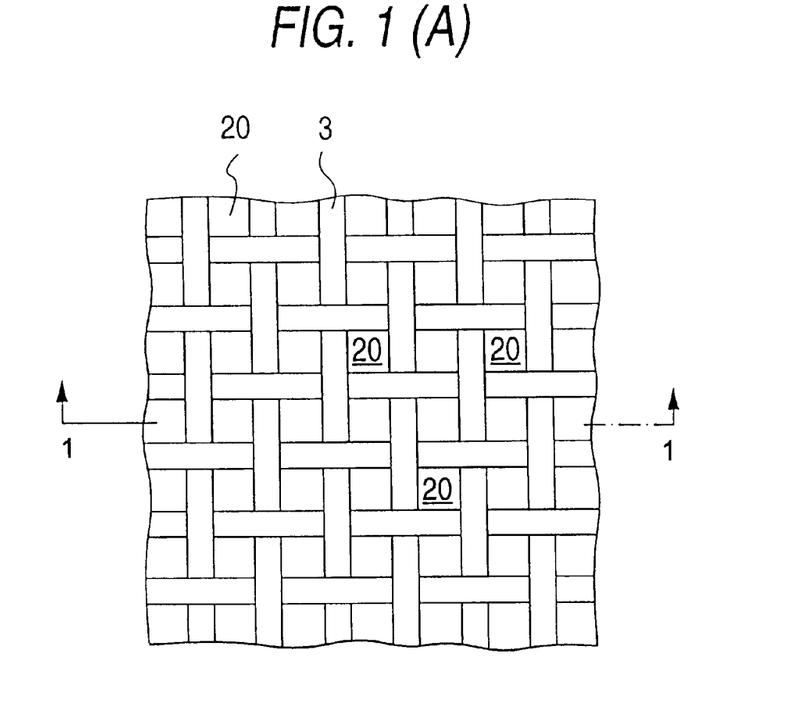
FIG. 1(A) is a plane view illustrating an embodiment of the pressure-sensitive cleaning sheet according to the present invention.
FIG. 1(B) is a sectional view taken on the line B—B of FIG. 1(A).

A card type pressure-sensitive cleaning sheet was obtained in the same manner as in Example 1, except that the porous screen was replaced with a polyester woven fabric having a lattice pattern such as that shown in FIG. 1.

In this cleaning sheet the ratio of the area $S_1$ of the exposed surface of the pressure-sensitive adhesive layer which had appeared on the sheet surface through the openings of the porous screen to the area $S_2$ of the surface of the non-exposed pressure-sensitive adhesive layer which the porous screen covers, $S_1/S_2$, was 1/2.5.

The adhesive strength of this cleaning sheet as determined by the method described hereinabove was 850 g/20 mm.

Comparative Example 1

A card type pressure-sensitive cleaning sheet was obtained in the same manner as in Example 1, except that the porous screen was omitted.

Comparative Example 2

A card type pressure-sensitive cleaning sheet was obtained in the same manner as in Example 3, except that the porous screen was omitted.

In order to compare the pressure-sensitive cleaning sheets obtained in the above Examples and Comparative Examples in performance, a card transport apparatus was fabricated which was similar to that in a reader/writer for rewritable cards. The draw rolls of the apparatus were intentionally fouled, and the cleaning sheets of the Examples and Comparative Examples were used in a test for cleaning the draw rolls. Twenty sheets of each sample were tested. As a result, the cleaning sheets of the Examples each was non-tacky to the touch prior to card insertion. These cards could be smoothly inserted without showing any adhesion at the card insertion opening. After passing through the apparatus, these cards showed almost the same non-tackiness as prior to insertion. The cards of the Examples could hence be smoothly taken out without showing adhesion at the card takeout opening.

In contrast, the cleaning sheets of the Comparative Examples each showed considerable adhesive transfer to the card insertion opening and card takeout opening, and the percentage of insertion failures and takeout failures was as high as about 97%.

From the fouled state of the card type cleaning sheets taken out, the cleaning sheets of the Examples were ascertained to have a sufficient cleaning effect. These cleaning sheets were almost comparable in cleaning effect to the cleaning sheets of Comparative Examples which had passed through the card takeout opening.

EXAMPLE 5

Cleaning sheets were obtained in the same manner as in Examples 1 and 2, except that the substrate was replaced with a poly(ethylene terephthalate) sheet having a thickness of 50 μm. These cleaning sheets were cut into the same width as an ink ribbon for bar code (Dura Ink H, manufactured by Nitto Denko Corporation), and then connected to the ink ribbon (length, 300 m) with a connecting tape (Splicing Tape No. 31B, manufactured by Nitto Denko Corporation; width, 30 mm) in the manners shown in FIGS. 4, 5, and 6. Each resultant ribbon was wound up. Thus, roll-form ink ribbons having a cleaning part were obtained.

The thus-obtained ink-ribbons having a cleaning part each was mounted on a bar code printer (Dura Printer R, manufactured by Nitto Denko Corporation), and continuously used for one week. As a result, no ink blurring occurred. On the other hand, an ink ribbon having no cleaning part was used in the same manner. As a result, ink blurring occurred in 24-hour continuous use.

While the invention has been described in detail and with reference to specific embodiments thereof, it will be apparent to one skilled in the art that various changes and modifications can be made therein without departing from the spirit and scope thereof.

What is claimed is:

1. A pressure-sensitive cleaning sheet comprising a substrate, a pressure-sensitive adhesive layer formed on one or both sides of the substrate, and a porous screen disposed on the pressure-sensitive adhesive layer, wherein the cleaning sheet is substantially non-tacky when the cleaning sheet surface is kept in a non-pressed state, under which the porous screen is projecting from the surface of the pressure-sensitive adhesive layer;

the cleaning sheet exhibiting tackiness when the cleaning sheet surface is kept in a pressed state, under which the pressure-sensitive adhesive layer appears on the sheet surface through the openings of the porous screen; and the cleaning sheet again becomes substantially non-tacky upon release from pressing.

2. A method of using a pressure-sensitive cleaning sheet comprising a substrate, a pressure-sensitive adhesive layer formed on one or both sides of the substrate, and a porous screen disposed on the pressure-sensitive adhesive layer, the cleaning sheet being substantially non-tacky when the cleaning sheet surface is kept in a non-pressed state, under which the porous screen is projecting from the surface of the pressure-sensitive adhesive layer, and the cleaning sheet exhibiting tackiness when the cleaning sheet surface is kept in a pressed state, under which the pressure-sensitive adhesive layer appears on the sheet surface through the openings of the porous screen to thereby have a surface which is on almost the same level as the surface of the porous screen and the cleaning sheet again becomes substantially non-tacky upon release from pressing, which comprises bringing the pressure-sensitive cleaning sheet into contact with a body to be cleaned, while pressing the cleaning sheet against the body.

3. The method of claim 2, wherein the ratio of the area $S_1$ of the exposed surface of the pressure-sensitive adhesive layer which has appeared on the sheet surface through the openings of the porous screen to the area $S_2$ of the non-exposed surface of the pressure-sensitive adhesive layer which the porous screen covers, $S_1/S_2$, is from 50/1 to 1/10.

4. The method of claim 2, wherein the body is selected from the group consisting of a magnetic reading part, a magnetic-card transport part, and a thermal head part for thermal transfer printing.

5. The method of claim 3, wherein the body is selected from the group consisting of a magnetic reading part, a magnetic-card transport part, and a thermal head part for thermal transfer printing.

6. A roll-form image-forming material having a cleaning part, the cleaning part comprising a pressure-sensitive adhesive layer having a porous screen disposed thereon, wherein the cleaning part is substantially non-tacky when the cleaning part surface is kept in a non-pressed state, under which the porous screen is projecting from the surface of the pressure-sensitive adhesive layer;

the cleaning part exhibits tackiness when the cleaning part surface is kept in a pressed state, under which the pressure-sensitive adhesive layer appears on the cleaning part surface through the openings of the porous screen; and the cleaning part again becomes substantially non-tacky upon release from pressing.

7. A method of cleaning an image-forming apparatus which comprises cleaning a thermal head and/or a transport roller of the apparatus by transporting through the apparatus a roll-form image-forming material having a cleaning part comprising a pressure-sensitive adhesive layer having a porous screen disposed thereon, wherein the cleaning part is substantially non-tacky when the cleaning part surface is kept in a non-pressed state, under which the porous screen is projecting from the surface of the pressure-sensitive adhesive layer;

the cleaning part exhibits tackiness when the cleaning part surface is kept in a pressed state, under which the pressure-sensitive adhesive layer appears on the cleaning part surface through the openings of the porous screen; and the cleaning sheet again becomes substantially non-tacky upon release from pressing.

8. The method of claim 7, wherein the ratio of the area $S_1$ of the exposed surface of the pressure-sensitive adhesive layer which has appeared on the sheet surface through the openings of the porous screen to the area $S_2$ of the non-exposed surface of the pressure-sensitive adhesive layer which the porous screen covers, $S_1/S_2$, is from 50/1 to 1/10.

9. The method of claim 7, wherein the image-forming material is one member selected from the group consisting of heat-sensitive recording papers, ink ribbons, and photographic printing papers.

10. The method of claim 8, wherein the image-forming material is one member selected from the group consisting of heat-sensitive recording papers, ink ribbons, and photographic printing papers.

* * * * *